United States Patent Office 3,418,983
Patented Dec. 31, 1968

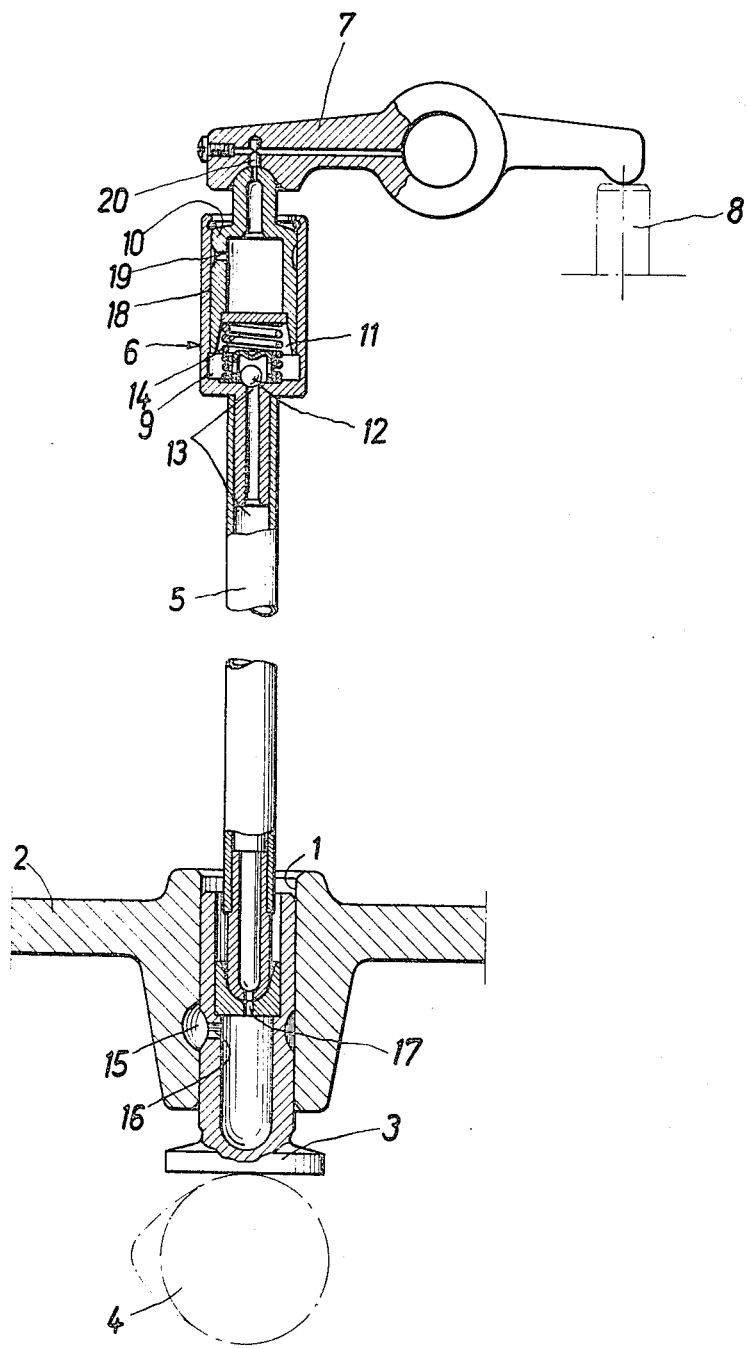

3,418,983
AUTOMATICALLY HYDRAULICALLY ADJUSTING PLAY-EQUALIZATION ELEMENT FOR THE VALVE CONTROL IN PISTON ENGINES
Hans-Jürgen Sossna, Ingolstadt, Germany, assignor to Motomak Motorenbau Maschinen- und Werkzeugfabrik, Konstruktionen G.m.b.H., Ingolstadt (Danube), Germany, a corporation of Germany
Filed Oct. 6, 1966, Ser. No. 584,711
Claims priority, application Germany, Oct. 7, 1965, M 66,871
2 Claims. (Cl. 123—90)

ABSTRACT OF THE DISCLOSURE

An automatically hydraulically adjusting play-equalization element for valve control in piston engines, which element consists of two longitudinally slidable telescopically members, one of which cooperates with the pushrod and the other cooperates with the valve rocker, the two members enclosing between them a pressure chamber connected by means of a check valve with an antechamber which is provided with pressure oil flowing from the end of the hollow pushrod through the said pushrod to the valve rocker. A leakage duct is provided at the telescopic face of the members to permit the passage of leaking oil to circumvent the upper wall of the pressure chamber in order to lubricate the valve rocker.

These play-equalization elements act to eliminate the free motion play occurring in the valve control rods which, for example, can develop due to abrasion or heat expansion. The action of this type of play-equalization element consists in that the telescoped parts forming the play equalization element are disposed in the valve control rods in a longitudinally slidable, counteracting manner. Their automatic, hydraulic adjustment to a free valve play of zero is achieved in that oil is supplied between the two parts forming the play-equalization elements, particularly oil from the circulation of the lubricant for the engine and the pressure oil travels through a check valve from the antechamber and forces the two element members apart until all free motion in the control rods is equalized. When the pressure chamber formed by these two members is completely filled with oil, an equalization element results, which forms a rigid coupling, which, however, is capable at any time of equalizing any degree of play occurring in the pushrods.

Piston engines are already known, where the lubrication oil, used for the lubrication of the parts moveable with respect to each other of the valve control rods, is fed in this case through the hollow valve rocker shaft. In such cases, the hydraulic equalization element which is to be provided with the lubricant is disposed in the valve rocker, whereby it is possible to either arrange the equalization element directly in the valve rocker or to couple it with the end of the pushrod facing the valve rocker. Another type of piston engine is known, wherein the lubricant is fed through bores to the valve tappet and from there to the other parts to be lubricated. In these cases, it is advantageous to arrange the equalization element directly in the valve tappet itself.

U.S. Patent No. 2,935,059 discloses disposing the equalization element on the end of the pushrod which faces the valve rocker, even when the lubricant is fed through the pushrod. This type of construction has the advantage that the equalization element can be installed or removed with comparative ease without necessitating the complete disassembly of the piston engine. Such a disassembly is usually required for piston engines having the equalization element disposed in the valve tappet itself. In very many cases, the pushrod can be removed only towards the crankshaft of the piston engine such as when the valve tappet is provided with a flange or a collar at its end facing the cam. However, even for those valve tappets with a constant diameter across the length of the tappet, a disassembly of the piston engine is necessary, since frequently the valve tappets cannot be grasped from the side of the valve rocker.

However, the equalization element of U.S. Patent No. 2,935,059 has a substantial disadvantage, since during the standing of the piston engine, one or another valve, depending upon the position of the pertinent cam is either partly or entirely open and the oil in the pressure chamber of the equalization element is subjected to the action of one part of, or of the entire valve spring tension. This oil thus subjected to pressure in the pressure chamber can now flow entirely or partly in a short time through the leakage duct required for the function of the equalization element from the pressure chamber. This means that when the piston engine is started again, the pressure chamber has to be refilled with pressure oil to equalize the free motion resulting from the discharge of the oil. However, in the known equalization elements, very little or no oil is available for filling the pressure chamber at the very moment when the engine is restarted, as the oil present in the hollow pushrod and in the other lubricant ducts, has in the meantime returned to the oil sump of the piston engine. This results in that at the beginning, only air will enter into the pressure chamber of the equalization element which, however, due to its compressibility, does not allow a transmission of the cam lift to the valve. Only after the oil has been fed through the lubricant pump for a long time and the air has escaped from the pressure chamber can a perfect function of the equalization element be anticipated. Aside from the very loud rattling noise which occurs during the starting phase, this has the disadvantage, particularly in internal combustion engines, which start only with difficulty, of unduly straining the starter members of these engines.

It is an object of the invention to provide an equalization element of simple construction and satisfactory performance during all phases of engine operation.

This and other objects and advantages of this invention will become obvious from the following detailed description.

The automatically, hydraulically adjusting play-equalization element of the invention for valve control in piston engines consists of two longitudinally slidable, telescoping members, one member cooperating with the pushrod and the other member cooperating with the valve rocker, said members enclosing a pressure chamber between them, said pressure chamber being connected by means of a check valve to an antechamber at least partly formed by the hollow pushrod, a check valve to prevent return flow of oil, the antechamber being supplied with pressure oil which flows from the end of the pushrod opposite the valve rocker through the pushrod.

A particularly advantageous form of the equalization element of the invention is provided with a throttled leakage duct leading out of the pressure chamber so that the emerging leaking oil can be used for the lubrication of subsequently arranged control members, and the antechamber can, according to a further characteristic of the invention, be disposed on the side of the pressure chamber opposite the valve rocker. Finally, according to a further characteristic of the invention, the check valve can be formed by one valve separating the antechamber from the pressure chamber to prevent the return flow of the oil or by two valves, one which connects the antechamber and the pressure chamber and a second valve which prevents the return flow of the oil.

Referring now to the drawing,

The figure is a cross-sectional view of one equalization element of the invention.

In the figure, a longitudinally, slidable valve tappet 3 is introduced in the bore 1 of housing 2 and a lifting movement is induced by cam 4 which is transmitted by valve tappet 3 through pushrod 5 and equalization element 6 to valve rocker 7 which in turn acts upon valve shaft 8. Equalization element 6 consists of an outer element member 9 rigidly mounted on the end of pushrod 5 and a second element member 10 which is introduced in a longitudinally slidable manner into member 9. Members 9 and 10 enclose a pressure chamber 11 between member 9 and the inserted endwall in member 10 which is connected through check valve 12 with antechamber 13 which is at least partly formed by hollow pushrod 5. Spring tension means 14 disposed in pressure chamber 11 forces members 9 and 10 of equalization element apart so that any play in the valve control rods is absolutely out of the question. The lubricant travels through bore 15 disposed in housing 2 and then through bore 16 in the wall of tappet 3 and through bore 17 into hollow pushrod 5 from where the lubricant can flow past check valve 12 into pressure chamber 11 of the equalization element 6. The dimensions of members 9 and 10 are such that they form a leakage duct 18 between themselves through which the lubricant can flow from pressure chamber 11 via bores 19 and 20 into valve rocker 7 where it can provide lubrication for the other parts moveable with respect to each other within the valve rocker.

A substantial advantage of the invention resides in the provision of a check valve in the antechamber to arrest the return flow of oil when the piston engine is not operating. However, in spite of the check valve, the oil may partially or entirely be discharged from the pressure chamber through the leakage duct. Since a large amount of oil is still present in the large antechamber at least partly formed by the hollow pushrod which is necessary to fill the pressure chamber, a sufficient amount of oil is immediately available when the piston engine is restarted so that the pressure chamber is directly refilled and the equalization element can transmit the full lifting movement after only a very short interruption. In other words, the time needed for supplying lubricant to the pressure chamber is shortened by the substantial amount of oil stored in the antechamber.

To definitely prevent oil from flowing out of the hollow pushrod even with the check valve disposed at the upper end of the rod, the inlet bore at the lower end of the valve plunger is advantageously of a diameter sufficient to obtain a capillary action. With a bore of too large a dimension, air bubbles could possibly enter into the hollow pushrod which could result in oil flowing out in spite of the check valve disposed at the upper end of the rod.

A particularly advantageous embodiment of the invention has the antechamber on the side of the pressure chamber opposite the valve rocker and the overflow oil, emerging from the leakage duct, serves at least partially to lubricate subsequent control parts. The leakage effects a very desirable metering of the lubricant without any special measures and prevents excess lubrication. The element of the invention has the further advantage that the check valve may be formed by one valve which separates the antechamber from the pressure chamber to prevent the return flow of the oil. This simplifies construction and assembly by the omission of a separate check valve for the prevention of oil return flows which reduces production costs.

Various modifications of the valve element of the invention may be made without departing from the spirit or scope thereof and it is to be understood that the invention is intended to be limited only as defined in the appended claims.

I claim:

1. An automatically hydraulically adjustable play-equalization element for valve control is piston engines comprising, hollow, telescoping members, one member being connected with a hollow pushrod and the other member engaging a valve rocker, said members enclosing a pressure chamber between them including a chamber endwall in said other member to prohibit the emission of fluid from said chamber, said pressure chamber including a check valve to an antechamber in said hollow pushrod, a leakage duct provided at the telescoping interface of said members and through said other member to the point of engagement with the valve rocker to permit the passage of excess or leaking oil to circumvent said endwall and pass through said other member to lubricate said valve rocker, said antechamber being at least partly formed by the hollow pushrod and being supplied with pressure oil which flows from the end of the hollow pushrod opposite the valve rocker through the hollow pushrod.

2. The play-equalization element of claim 1 wherein the check valve which connects the antechamber and pressure chamber also prevents the return flow of oil.

References Cited

UNITED STATES PATENTS

| | | | |
|---|---|---|---|
| 1,792,836 | 2/1931 | Handwerker. | |
| 2,381,339 | 8/1945 | Doman | 123—90 |
| 2,682,865 | 7/1954 | Voorhies | 123—90 |
| 2,874,684 | 2/1959 | Thompson | 123—90 |
| 2,878,796 | 3/1959 | Mannerstedt | 123—90 |
| 3,124,114 | 3/1964 | Voorhies | 123—90 |

AL LAWRENCE SMITH, *Primary Examiner.*

U.S. Cl. X.R.

184—6